US012703893B2

(12) United States Patent
Kawasaki et al.

(10) Patent No.: US 12,703,893 B2
(45) Date of Patent: Aug. 11, 2026

(54) METHOD FOR RECOVERING VALUABLE METAL FROM USED LIB

(71) Applicant: MITSUBISHI MATERIALS CORPORATION, Tokyo (JP)

(72) Inventors: Hajime Kawasaki, Iwaki (JP); Atsuhiro Nabei, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 413 days.

(21) Appl. No.: 18/278,427

(22) PCT Filed: Mar. 8, 2022

(86) PCT No.: PCT/JP2022/009980
§ 371 (c)(1),
(2) Date: Aug. 23, 2023

(87) PCT Pub. No.: WO2022/191179
PCT Pub. Date: Sep. 15, 2022

(65) Prior Publication Data

US 2024/0132995 A1 Apr. 25, 2024
US 2024/0229190 A9 Jul. 11, 2024

(30) Foreign Application Priority Data

Mar. 11, 2021 (JP) ................................ 2021-039636

(51) Int. Cl.
*C22B 9/16* (2006.01)
*C22B 7/00* (2006.01)
(Continued)

(52) U.S. Cl.
CPC ................ *C22B 9/16* (2013.01); *C22B 7/003* (2013.01); *C22B 15/0028* (2013.01);
(Continued)

(58) Field of Classification Search
None
See application file for complete search history.

(56) References Cited

U.S. PATENT DOCUMENTS

2017/0005374 A1* 1/2017 Brouwer ............ C22B 21/0069
2020/0263276 A1* 8/2020 Takeda .................... C22B 23/04

FOREIGN PATENT DOCUMENTS

EP 3715485 A1 9/2020
JP S54-123561 A 9/1979
(Continued)

OTHER PUBLICATIONS

International Search Report mailed May 24, 2022, issued for PCT/JP2022/009980 and English translation thereof.
(Continued)

*Primary Examiner* — Xiaowei Su
(74) *Attorney, Agent, or Firm* — Troutman Pepper Locke LLP

(57) ABSTRACT

This method for recovering a valuable metal from a used LIB includes: a step of adding, to an electrode assembly taken out of a detoxified used LIB, metallic zinc in an excess amount relative to a mass of the electrode assembly; a step of heating a mixture of the electrode assembly and the metallic zinc to form a molten metal; a step of taking out the molten metal and separating the molten metal into an alloy metal and a slag; and a step of heating the alloy metal to volatilize zinc in the alloy metal, and thereby, recovering an alloy metal of a valuable metal.

8 Claims, 1 Drawing Sheet

(51) Int. Cl.
*C22B 15/00* (2006.01)
*C22B 23/02* (2006.01)
*H01M 10/54* (2006.01)

(52) U.S. Cl.
CPC .......... *C22B 15/0056* (2013.01); *C22B 23/02* (2013.01); *H01M 10/54* (2013.01)

(56) References Cited

FOREIGN PATENT DOCUMENTS

| | | | |
|---|---|---|---|
| JP | H09-087755 | A | 3/1997 |
| JP | 2019-135321 | A | 8/2019 |
| JP | 6589966 | B2 | 10/2019 |
| JP | 6615762 | B2 | 12/2019 |
| WO | 2015/096945 | A1 | 7/2015 |

OTHER PUBLICATIONS

Jirang Cui et al., "Metallurgical recovery of metals from electronic waste: A review", Journal of Hazardous Materials, vol. 158, No. 2-3, Oct. 30, 2008, pp. 228-256. (cited in the May 26, 2025 Search Report issued for EP22767133.6).

Inge Bellemans et al., "Metal losses in pyrometallurgical operations—A review", Advances in Colloid and Interface Science, vol. 255, May 1, 2018, pp. 47-63. (cited in the May 26, 2025 Search Report issued for EP22767133.6).

Supplementary European Search Report mailed May 26, 2025, issued for EP22767133.6.

* cited by examiner

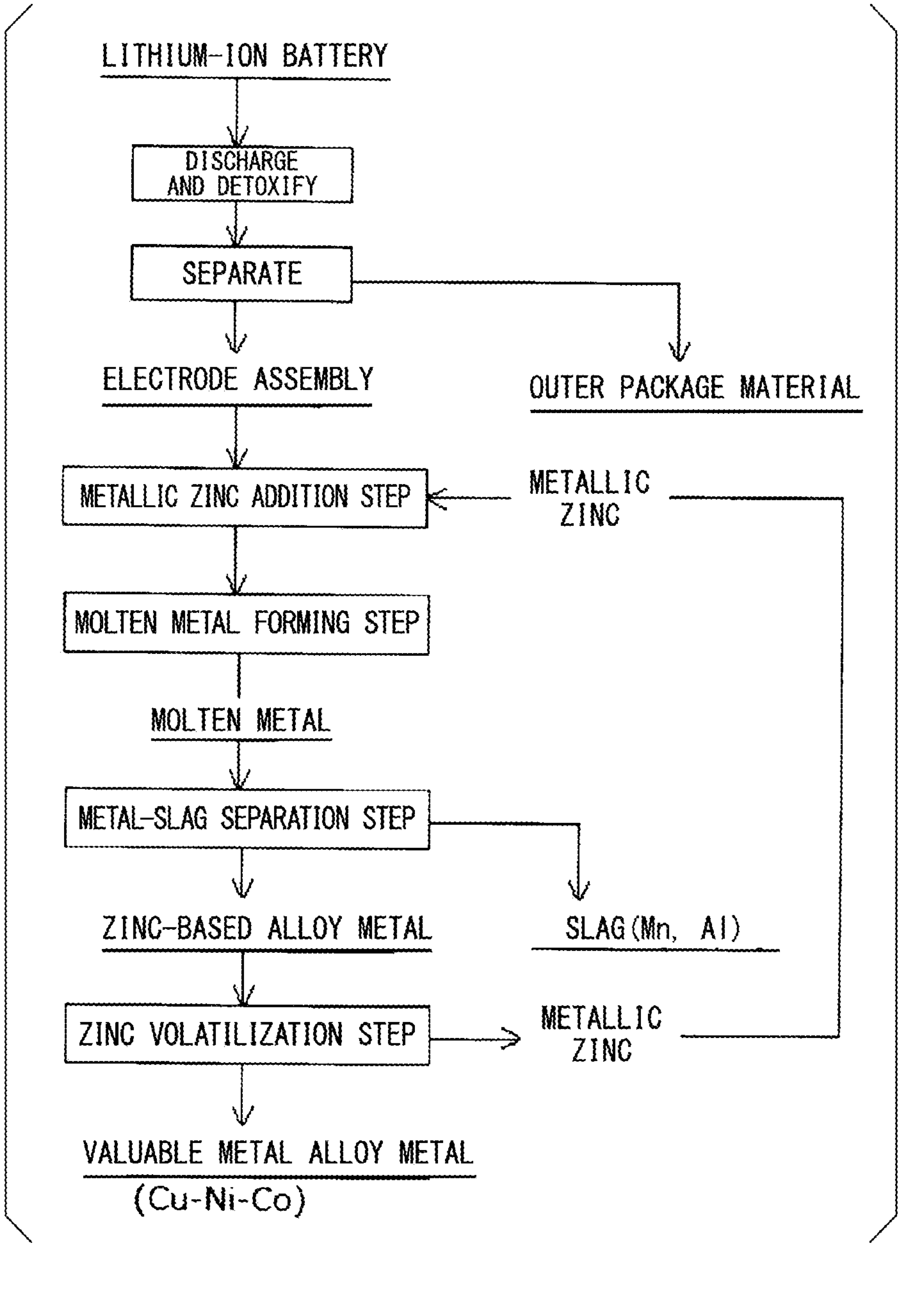
LITHIUM-ION BATTERY
DISCHARGE AND DETOXIFY
SEPARATE
ELECTRODE ASSEMBLY
OUTER PACKAGE MATERIAL
METALLIC ZINC ADDITION STEP
METALLIC ZINC
MOLTEN METAL FORMING STEP
MOLTEN METAL
METAL-SLAG SEPARATION STEP
ZINC-BASED ALLOY METAL
SLAG(Mn, Al)
ZINC VOLATILIZATION STEP
METALLIC ZINC
VALUABLE METAL ALLOY METAL
(Cu-Ni-Co)

METHOD FOR RECOVERING VALUABLE METAL FROM USED LIB

TECHNICAL FIELD

The present invention relates to a method for recovering a valuable metal such as cobalt, nickel, and copper from a used lithium-ion secondary battery (hereinafter, referred to as a used LIB).

The present application claims priority on Japanese Patent Application No. 2021-039636 filed on Mar. 11, 2021, the content of which is incorporated herein by reference.

BACKGROUND ART

Electrode materials for lithium-ion batteries contain valuable metals such as cobalt, nickel, copper, and aluminum together with lithium, and for the effective use of resources, it is required to efficiently recover these valuable metals contained in used LIBs.

Patent Document 1 describes a recovery method using a copper refining furnace. Specifically, a raw material containing the above-described valuable metals of a used LIB or the like is put into a copper refining furnace, an alloy of the above-described valuable metals and copper is generated by reducing and melting, and copper, nickel, and the like are separated and recovered from the alloy.

Patent Document 2 describes the following method. A used LIB is put into a converter for copper refining without a copper mat, and combustion is carried out by using residual heat. Next, a copper mat is charged, and oxygen is blown for melting to generate an alloy of the above-described valuable metals and copper. Next, copper, nickel, and the like are separated and recovered from the alloy.

Patent Document 3 describes the following method. A used LIB is subjected to oxidation roasting at a temperature of 600° C. or higher, and the obtained roasted material is reduced and melted by adding a reducing agent such as carbon and a flux to generate an alloy containing valuable metals. Then, the valuable metals are recovered from the alloy separated from the slag.

In the recovery methods of Patent Documents 1 and 2, an alloy of valuable metals and copper is formed by using copper as a collector metal, and the valuable metals are recovered from the alloy. However, among the valuable metals, cobalt is easy to oxidize and transferred to the slag under the above-described conditions, and thus it is difficult to recover the cobalt. In addition, in the recovery method of Patent Document 3, cobalt and copper are alloyed during melting in the presence of the reducing agent such as carbon. Accordingly, it is necessary to control the added amount of the reducing agent in order to control the oxygen partial pressure, and these operations are complicated.

CITATION LIST

Patent Documents

[Patent Document 1]
Japanese Patent No. 6615762

[Patent Document 2]
Japanese Patent No. 6589966

[Patent Document 3]
Japanese Unexamined Patent Application, First Publication No. 2019-135321

SUMMARY OF INVENTION

Technical Problem

The present invention aims to provide a method for recovering a valuable metal which solves the above-described problems of the related art. Specifically, the present invention aims to provide a method for recovering a valuable metal by which cobalt can be easily recovered.

Solution to Problem

The present invention solves the above-described problems by the method having the following configurations. Specifically, zinc that is more easily oxidized than copper is used as a collector metal. Thereby, without adding a reducing agent, cobalt can be concentrated on the metal side and easily recovered by using the oxygen potential during the oxidation reaction of zinc in a step of forming a molten metal.

[1] A method for recovering a valuable metal from a used LIB, including: a step of adding, to an electrode assembly taken out of a detoxified used LIB (hereinafter, referred to as an electrode assembly), metallic zinc in an excess amount relative to a mass of the electrode assembly; a step of heating a mixture of the electrode assembly and the metallic zinc to form a molten metal; a step of taking out the molten metal and separating the molten metal into an alloy metal and a slag; and a step of heating the alloy metal to volatilize zinc in the alloy metal, and thereby, recovering an alloy metal of a valuable metal.

[2] The method for recovering a valuable metal from a used LIB according to [1], in which the metallic zinc is added in an amount of 10 to 20 times by mass an amount of a cathode active material in the electrode assembly.

[3] The method for recovering a valuable metal from a used LIB according to [1] or [2], in which the molten metal containing the alloy metal of zinc and the valuable metal is formed by heating at a temperature of 600° C. to 900° C. in the atmosphere.

[4] The method for recovering a valuable metal from a used LIB according to any one of [1] to [3], in which the alloy metal separated from the slag is heated at a temperature of 910° C. or higher to volatilize the zinc in the alloy metal, and an alloy metal of copper, nickel, and cobalt is recovered.

Advantageous Effects of Invention

According to the recovery method according to one aspect of the present invention, most of the nickel and cobalt contained in the cell can be alloyed and recovered, and thus the loss due to slagging of the nickel and cobalt is small.

In the recovery method according to one aspect of the present invention, in the step of forming the molten metal, since the oxygen potential is determined by the redox reaction of Zn/ZnO, the reduction reaction by carbon may be ignored. Therefore, it is not necessary to separate the active materials for the cathode and the anode included in the cell. The active material for the anode mainly consists of graphite, and in accordance with the recovery method according to one aspect of the present invention, the separation treatment for a used LIB is significantly easily performed since the cathode and the anode can be treated without separating the cathode and the anode.

The valuable metal alloy recovered by the recovery method according to one aspect of the present invention is spongy. Accordingly, the valuable metal alloy has high solubility in an acid, and is easy to be subjected to a subsequent wet treatment. In addition, since the volatilized and distilled metallic zinc can be recovered and repeatedly used, treatment costs can be reduced. In addition, in the recovery method according to one aspect of the present invention, the outer package material for the LIB is removed in advance, and the electrode assembly is treated. Accordingly, the outer package material can be treated separately from the cell, and in a case where the outer package material is an aluminum material, aluminum can be easily recovered.

BRIEF DESCRIPTION OF DRAWINGS

FIG. 1 is a process flow diagram showing an example of the present invention.

DESCRIPTION OF EMBODIMENTS

A method for recovering a valuable metal from a used LIB according to the present embodiment includes the following steps.

(1) A step of adding, to an electrode assembly taken out of a detoxified used LIB, metallic zinc in an excess amount relative to the mass of the electrode assembly.
(2) A step of heating a mixture of the electrode assembly and the metallic zinc to form a molten metal.
(3) A step of taking out the molten metal and separating the molten metal into an alloy metal and a slag.
(4) A step of heating the alloy metal to volatilize zinc in the alloy metal, and thereby, recovering an alloy metal of a valuable metal.

Hereinafter, the steps will be explained.

[Metallic Zinc Addition Step]

The recovery method according to the present invention includes a metallic zinc addition step of adding metallic zinc in an excess amount relative to the mass of an electrode assembly. In a LIB cell, a cathode and an anode form a pair with an electrolytic solution and a separator interposed therebetween, and these are accommodated in an outer package material. The outer package material and the electrolytic solution are removed from the used LIB which has been discharged and detoxified, to obtain an electrode assembly (an electrode assembly taken out of the used LIB), and the electrode assembly is mixed with metallic zinc and the mixture is charged into a heating furnace. The electrode assembly includes components such as a cathode current collector, a cathode active material, a separator, an anode current collector, and an anode active material after physical sorting such as crushing and sieving. Table 1 shows representative examples of the metal components contained in the electrode assembly.

The added amount of the metallic zinc is excessive relative to the mass of the electrode assembly. Specifically, for example, the amount of the metallic zinc is preferably 10 to 20 times by mass the amount of the cathode active material contained in the electrode assembly. In a case where the amount of the metallic zinc added is less than 10 times by mass, useful components such as cobalt in the electrode assembly are not sufficiently reduced, and an alloy metal of zinc and a valuable metal is not sufficiently formed. Moreover, the ratio of ZnO increases (the ratio Zn/ZnO decreases), and thus the amount of slag increases. Accordingly, the separation into the alloy metal and the slag is not sufficient, and it becomes difficult to separate and recover the valuable metal. Meanwhile, in a case where the amount of the metallic zinc is greater than 20 times by mass, the amount of zinc volatilized in the zinc volatilization step after alloying of the valuable metal increases, and this is not economical.

The mass of the cathode active material in the electrode assembly is obtained as follows. The concentrations of Ni, Co, and Mn in the electrode assembly are measured using ICP-AES. From the concentrations, the amount (mass) of each metal element is calculated. The mass of the cathode active material is calculated by summing the amounts (masses).

[Molten Metal Forming Step]

The mixture of the electrode assembly and the metallic zinc in the furnace is heated at a temperature that is equal to or higher than the melting point of the metallic zinc and lower than the boiling point of the metallic zinc in the atmosphere to form a molten metal containing an alloy metal of zinc and a valuable metal. However, in a case where the temperature for forming the molten metal is as low as near the melting point, it takes time to conduct the separation into the slag and the metal, and thus the temperature for forming the molten metal is desirably 600° C. or higher. In addition, in a case where the temperature for forming the molten metal is close to the boiling point of the metallic zinc, the vapor pressure increases, and the amount of the volatilized metallic zinc increases. Accordingly, the temperature for forming the molten metal is desirably 900° C. or lower.

Regarding the heating time, the temperature is preferably retained at a temperature of 600° C. or higher and 900° C. or lower for 2.5 hours to 5 hours. In a case where the retaining time is shorter than 2 hours, it becomes difficult to conduct the separation into the slag and the metal. Meanwhile, the effect does not change much even in a case where the retaining time is longer than 5 hours.

When the electrode assembly and the metallic zinc are mixed and melted by heating, due to the oxygen potential of the zinc oxidation reaction ($2Zn+O_2 \rightarrow 2ZnO$), copper, nickel, and cobalt contained in the cell are incorporated in the metal phase together with the zinc, and thus a zinc-based alloy containing cobalt, nickel, and copper is formed. Meanwhile, manganese and aluminum contained in the cell are transferred as oxides to the slag phase together with the partially oxidized zinc.

As shown in the Ellingham diagram in which the relationship between the oxygen partial pressure and the free energy of formation of metal oxide is graphed, all the free energies in the redox reactions of cobalt, nickel, and copper are positioned higher than the free energy in the redox reaction of zinc. Therefore, the cobalt, nickel, and copper are more easily reduced than the zinc, and are incorporated into the zinc as a metal phase, and thereby, a zinc-based alloy (alloy metal) containing the cobalt, nickel, and copper is formed. Meanwhile, since the free energies in the redox reactions of manganese and aluminum are positioned lower than the free energy in the redox reaction of zinc, the manganese and aluminum are more easily oxidized than the zinc. These form oxides and are transferred to the slag phase.

In the methods using a copper refining process according to the related art, copper is used as a collector metal. However, as shown in the Ellingham diagram, the free energy in the redox reaction of copper is positioned higher than the free energies in the oxidation reactions of cobalt and nickel, and the cobalt, nickel, and the like are less likely to be reduced than copper. For this reason, most of cobalt, nickel, and the like are transferred to the slag phase in the form of oxide used as the materials for the LIB, and thus the recovery ratio of these materials as a copper-based alloy is low.

[Step of Separating into Metal and Slag]

The molten metal of the alloy metal and the slag is taken out from the furnace and is cooled by water. When an impact is applied to the cooled molten metal, the cooled molten metal is easily separated into a metal portion and a slag portion.

[Zinc Volatilization Step]

When the alloy metal separated from the slag is recovered and heated at a temperature equal to or higher than the boiling point of zinc, for example, 910° C. or higher to volatilize the zinc in the alloy metal, a valuable metal alloy of copper-cobalt-nickel is obtained. When heating is performed to recover the volatilized zinc, the heating is desirably performed under vacuum and an anaerobic condition. Due to volatilization of a zinc portion, the valuable metal alloy is spongy and has high solubility in an acid; and therefore, the valuable metal alloy is easy to be subjected to a subsequent wet treatment. Since the volatilized and distilled metallic zinc can be recovered and repeatedly used, treatment costs can be reduced.

The expression "under vacuum and an anaerobic condition" means that in order to prevent the oxidation of the zinc, the atmosphere inside the furnace is set to an inert gas (Ar or $N_2$) atmosphere, and in order to lower the boiling point, the pressure inside the furnace is reduced to create a vacuum state, and the treatment is carried out in this vacuum state.

FIG. 1 shows an example of a process flow according to the present embodiment. As shown in the drawing, a lithium-ion battery is discharged and detoxified. An outer package material is then removed and separated from an electrode assembly. Metallic zinc is added to the electrode assembly (metallic zinc addition step) and the mixture is charged into a heating furnace to be melted by heating, and a molten metal containing a slag and a metal is formed (molten metal forming step). The molten metal is cooled to be separated into the zinc-based alloy metal and the slag (metal-slag separation step), the zinc-based alloy metal is heated at temperature of the boiling point of zinc or higher to volatilize the zinc (zinc volatilization step), and a valuable metal alloy metal containing Cu—Ni—Co is recovered. The volatilized zinc vapor (metallic zinc) is recovered, returned to the metallic zinc addition step, and reused as a metallic zinc source.

Examples

Hereinafter, Examples of the present invention will be shown. The analysis values in the tables were measured by fluorescent X-ray analysis and SEM-EDX.

Examples

A used LIB was discharged and detoxified, and then an outer package material was removed to recover an electrode assembly. Table 1 shows the metal components of the electrode assembly. 100 g of metallic zinc relative to 5 g of a cathode active material of the electrode assembly was mixed. The obtained mixture was charged into an electric furnace. The temperature was increased to 880° C. in the atmosphere, and retained for 4 hours to form a molten metal. After that, the molten metal was taken out from the inside of the furnace, cooled by water, and separated into 74.7 g of a metal and 53.9 g of a slag, and the metal and the slag were recovered. The metal components contained in the metal and the slag were measured.

The metal components of the separated metal and slag are shown in Table 2 (Test No. 1A).

The separated metal was put into an electric furnace, and the atmosphere inside the furnace was set to an argon atmosphere. Next, the pressure inside the furnace was reduced to provide a vacuum state. In this vacuum atmosphere, the metal was heated at 910° C. to evaporate the zinc, and a spongy alloy metal was thus obtained. The metal components contained in the spongy alloy metal are shown in Table 2 (Test No. 1B).

In Table 2, the ratio of the amount of each element to the total amount of Ni, Co, Mn, Cu, and Al is shown by mass %.

A molten metal was formed in the same manner as in Test No. 1A, except that the added amount of metallic zinc relative to 5 g of the cathode active material was set to 50 g, and 44.8 g of a metal and 35.4 g of a slag were obtained. The metal components contained in the metal and the slag were measured. The results are shown in Table 2 (Test No. 2).

A molten metal was formed in the same manner as in Test No. 1A, except that the heating temperature of the electric furnace was 800° C., and 81.1 g of a metal and 47.5 g of a slag were obtained. The metal components contained in the metal and the slag were measured. The results are shown in Table 2 (Test No. 3).

A used LIB was discharged and detoxified, and then an outer package material was removed to recover an electrode assembly. 40 g of metallic zinc relative to 5 g of a cathode active material of the electrode assembly was mixed. The obtained mixture was charged into an electric furnace. The temperature was increased to 900° C. in the atmosphere, and retained for 2 hours to form a molten metal. After that, the molten metal was taken out from the inside of the furnace, cooled by water, and recovered (Test No. 4). The sample after recovery was low in separability between the metal and the slag, and it was difficult to conduct the separation into the metal and the slag and the recovery thereof.

As shown in Table 2, the metals of Test Nos. 1A, 2, and 3 contained zinc, copper, nickel, and cobalt, and the nickel and cobalt, that are valuable metals, can be recovered as a part of the alloy. In addition, as shown in Test No. 1B, by heating the alloy of Test No. 1A at 910° C. and volatilizing the zinc, the alloy of nickel, cobalt, and copper can be recovered.

On the other hand, in a case where the amount of the metallic zinc added to the electrode assembly was less than 10 times by mass and the melting time was about 2 hours, it became difficult to conduct the separation into the metal and the slag. Thus, it was confirmed that it is preferable that the amount of the metallic zinc is equal to or greater than 10 times by mass and the melting time is equal to or longer than 2.5 hours.

TABLE 1

| Metal Components of Electrode Assembly | | | | | | |
|---|---|---|---|---|---|---|
| | Ni | Co | Mn | Cu | Al | others |
| Mass % | 2.9 | 2.9 | 2.9 | 36.3 | 20.1 | 34.9 |
| g | 1.0 | 1.0 | 1.0 | 12.3 | 6.8 | 11.8 |

TABLE 2

Metal Components of Metal and Slag

| Test No. | Cathode Active Material | Metallic Zinc | Melting Temperature | Retaining Time | Kind: Amount | Zn | Ni | Co | Mn | Cu | Al |
|---|---|---|---|---|---|---|---|---|---|---|---|
| 1A | 5 g | 100 g | 880° C. | 4 h | Metal: 74.7 g | 80.0 | 1.6 | 1.7 | — | 16.7 | — |
| | | | | | Slag: 53.9 g | 68.8 | — | — | 0.9 | — | 12.6 |
| 1B | — | — | 910° C. (Volatilization Temperature) | — | Metal | — | 8.0 | 8.4 | — | 83.6 | — |
| 2 | 5 g | 50 g | 880° C. | 4 h | Metal: 44.8 g | 66.7 | 2.7 | 2.7 | — | 27.9 | — |
| | | | | | Slag: 35.4 g | 53.4 | — | — | 13.4 | — | 19.2 |
| 3 | 5 g | 100 g | 800° C. | 4 h | Metal: 81.1 g | 81.6 | 1.5 | 1.5 | — | 15.4 | — |
| | | | | | Slag: 47.5 g | 64.5 | — | — | 1.0 | — | 14.3 |
| 4 | 5 g | 40 g | 900° C. | 2 h | It was difficult to conduct the separation into a metal and a slag. | | | | | | |

(Notes)
No. 1A shows a metal and a slag separated from the molten metal.
No. 1B shows a metal after volatilization of zinc, and the temperature in No. 1B is a volatilization temperature.
Nos. 2 and 3 show a metal and a slag separated from the molten metal.
The symbol "—" in the table represents that the value was less than the lower limit value for analysis.
No. 4 is an example outside the preferable range.

INDUSTRIAL APPLICABILITY

The present embodiment is suitably applied to a step of recovering valuable metals such as cobalt, nickel, and copper from a used LIB.

What is claimed is:

1. A method for recovering a valuable metal from a used lithium ion secondary battery, LIB, comprising:

a step of adding, to an electrode assembly taken out of a used LIB, which has been discharged and detoxified, metallic zinc in an amount of 10 times or more by mass relative to an amount of a cathode active material contained in the electrode assembly;

a step of heating a mixture of the electrode assembly and the metallic zinc to form a molten metal;

a step of taking out the molten metal and separating the molten metal into an alloy metal and a slag; and a step of heating the alloy metal to volatilize zinc in the alloy metal, and thereby, recovering an alloy metal of the valuable metal, wherein the valuable metal is one or more of copper, nickel, and cobalt.

2. The method for recovering a valuable metal from a used LIB according to claim 1, wherein the metallic zinc is added in an amount of 10 to 20 times by mass relative to the amount of the cathode active material in the electrode assembly.

3. The method for recovering a valuable metal from a used LIB according to claim 1, wherein the molten metal containing the alloy metal of zinc and the valuable metal is formed by heating at a temperature of 600° C. to 900° C. in an atmosphere.

4. The method for recovering a valuable metal from a used LIB according to claim 1, wherein the alloy metal separated from the slag is heated at a temperature of 910° C. or higher to volatilize the zinc in the alloy metal, and an alloy metal of copper, nickel, and cobalt is recovered.

5. The method for recovering a valuable metal from a used LIB according to claim 2, wherein the molten metal containing the alloy metal of zinc and the valuable metal is formed by heating at a temperature of 600° C. to 900° C. in an atmosphere.

6. The method for recovering a valuable metal from a used LIB according to claim 2, wherein the alloy metal separated from the slag is heated at a temperature of 910° C. or higher to volatilize the zinc in the alloy metal, and an alloy metal of copper, nickel, and cobalt is recovered.

7. The method for recovering a valuable metal from a used LIB according to claim 3, wherein the alloy metal separated from the slag is heated at a temperature of 910° C. or higher to volatilize the zinc in the alloy metal, and an alloy metal of copper, nickel, and cobalt is recovered.

8. The method for recovering a valuable metal from a used LIB according to claim 5, wherein the alloy metal separated from the slag is heated at a temperature of 910° C. or higher to volatilize the zinc in the alloy metal, and an alloy metal of copper, nickel, and cobalt is recovered.

* * * * *